March 24, 1964  G. V. ZITO  3,126,512
ION AIR DENSITY SENSOR INCLUDING DARK CURRENT CORRECTION MEANS
Filed April 25, 1960  3 Sheets-Sheet 1

INVENTOR.
GEORGE V. ZITO
BY Herbert L. Davis
ATTORNEY

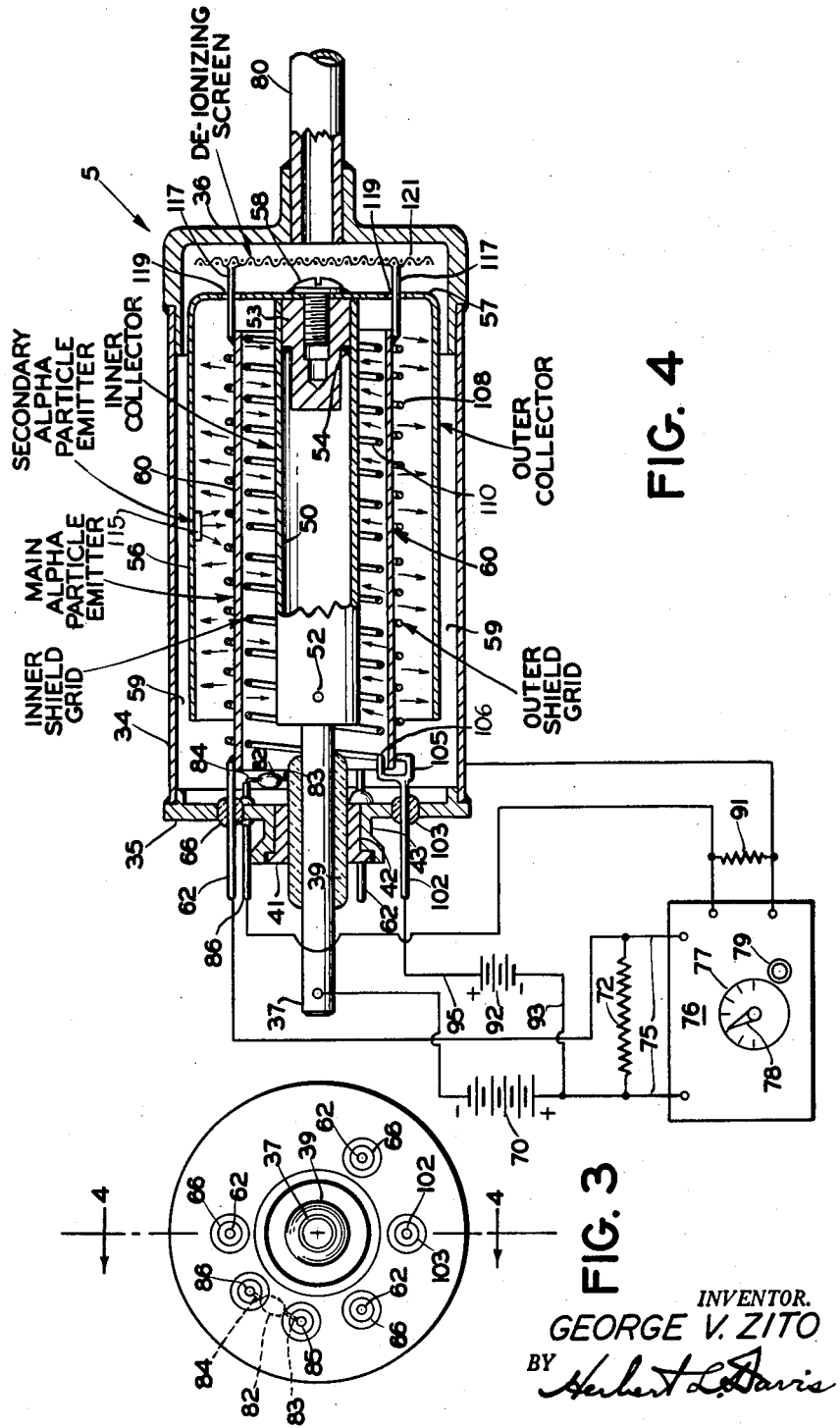

United States Patent Office 3,126,512
Patented Mar. 24, 1964

3,126,512
ION AIR DENSITY SENSOR INCLUDING DARK
CURRENT CORRECTION MEANS
George V. Zito, Northvale, N.J., assignor to The Bendix
Corporation, a corporation of Delaware
Filed Apr. 25, 1960, Ser. No. 24,474
9 Claims. (Cl. 324—33)

This invention relates to improvements in an ion air density sensor of a type such as disclosed and claimed in copending U.S. application Serial No. 693,323 filed October 30, 1957 by George V. Zito; U. S. application Serial No. 15,449 filed March 16, 1960 by Joseph Steenfeld and George V. Zito, now U.S. Patent No. 3,093,792, granted July 11, 1963; and U.S. application Serial No. 16,358 filed March 21, 1960 by George V. Zito and Edward A. Chilton, now U.S. Patent No. 3,044,012, granted July 10, 1962, and which application and patents have all been assigned to The Bendix Corporation, assignee of the present invention.

More particularly the present invention relates to an improved radioactive ionization pressure gage including novel means for correcting the gage for the effects of so-called dark current tending to introduce inaccuracies therein.

Essentially, the term dark current as herein used applies to any current present in such gages at very low pressures which is not a function of the pressure measured. In this sense it is a "residual" current which limits the low pressure measuring ability of the gage, the output being otherwise a function of gas density alone. The exact nature and causes of dark current are not thoroughly understood nor adequately covered in the literature. It has been found, however, that should such a gage be operated at some fixed potential, the output current of such gage will decrease with decreasing gas density down to the dark current value whereupon further decreases in gas density will not lower the value of the output current. Similarly, the gage may be operated at the opposite polarity, and the value of the dark current will be minimal and somewhat different from the value of the dark current under the previous operating conditions.

It has been found by the inventor that such dark current may be attributed to the following factors:

(1) Slow electrons from source material
(2) Secondary electron emission from the collector
(3) Radioactive disintegration As to factor (1) it will be noted that with zero volts applied across the gage device an output current is obtained which is negative going with respect to ground. This is not what might be expected, since the source material used is primarily an alpha particle emitter. Instead, it might be expected that the alpha particles, being positive charges, would yield a positive current, but experience with a number of such gages having a variety of configurations have disclosed a distinctly different negative current effect. Experimental procedures disclose that instead the source material emits a large number of slow electrons, which can only be accounted for by assuming that some of the alpha particles and other primary ionizing particles generated by the source are stopped or slowed within the source material. These stopped particles may liberate such slow electrons which would then be present in the interstices of the device and respond to the collection field when it is applied. The existence of this type of emission, as a result of the alpha particle bombardment of metals, is well established, and such emissions were at one time termed "delta rays," although the term seems to have fallen into disuse. In this discussion such electrons will be termed "delta electrons" or slow electron emissions to distinguish them from other carrier electrons involved in the gage phenomenon.

It was found then that in such a gage if a screen or repeller grid is placed in close proximity to the source and maintained at a relatively low potential negative in respect to the source, the output current will decrease more than 30% in a field of one polarity, and remain substantially constant in a field of an opposite polarity, where the output current in the field of the one polarity is largely a result of these delta electrons from the source, being accelerated to the collector electrode by the field. While in the field of opposite polarity the operating conditions are such as to repel these electrons. In the field of the one polarity, the output current decreases only slightly with the retarding screen in place, showing that the output current is less a function of the slow delta electrons than it is of higher energy source particles. In the field of opposite polarity if the screen in the form of a shield grid is maintained at a potential sufficiently more positive than the source electrode, the "delta electrons" or slow electron emissions from the source will be collected by the screen or shield grid and prevented from traversing the sensitive volume.

With the foregoing recognition of the problem as to factor (1) in mind, an object of the invention is to provide novel means to retard or correct for the "delta electrons" or slow electron emissions so as to solve the problem presented by the factor (1) through the provision of a screen or shield grid placed in close proximity to the source of radioactive material or alpha particle emitter and maintained at a potential sufficiently more positive than the source that the "delta electrons" or slow electron emissions by the source of alpha particles will be collected by the grid and prevented from traversing the sensitive volume.

Moreover, in regard to the heretofore noted factor (2) and in reference to the Curve A—A of the graph shown herein at FIGURE 5, the point $I_{oc}$ has been discovered to be a function of the collector material and of the condition of the collector surfaces. Experimental evidence secured from a variety of collector materials further discloses that if $E_0$ is plotted as a function of collector material, the cross-over point at $I_{oc}$ will be inversely proportional to the secondary electron emission yield of the collector: the greater the secondary electron emission yield, the closer to zero will point $E_0$ fall. It is believed that this is due to the emission of secondary electrons at the collector as a result of the impingement of primary particles of higher energy from the source. Secondary electrons leaving the collector will tend to make the collector more positive in potential, and this subtracts from the negative going current originated by the source.

In this connection, platinum or rhodium make good secondary emitters, and accordingly these metals may be plated to the collector. Although platinum yields a somewhat lower $E_0$ value than rhodium, rhodium has been decided upon for several contingent reasons. Rhodium is the least affected by atmospheric chemicals, and hence it is possible to maintain a cleaner surface for a longer period of time than is the case with platinum. A clean surface is important for a low, reproducible value of the dark current, and rhodium yields the lowest dark current value of all metals tested, and is second only to platinum in $E_0$ value. Rhodium also is the least affected of all known metals with respect to induced radioactivity.

In addition, in the device hereinafter described, since a rhodium flash covers the source material, those consequences due to dissimilar metals, which seem to play some role in the value of point $I_{oc}$, are excluded. If the collector surfaces are first polished and then rhodium plated, the smooth hard surface of the rhodium greatly decreases gas sorption to help minimize out-gassing time at very low pressures.

Therefore, it is a further object of the invention to reduce the adverse effects of the secondary electron emissions by first polishing and then rhodium plating the collector surfaces.

Further, with reference to the heretofore noted factor (3), the fact that the dark current is also a function of source strength has long been known, and is what one would expect if the collector electrode "sees" the source, a configuration otherwise desirable for maximum ion collection efficiency. The structure of the gage is such as to permit the "seeing" in order to provide efficient collection. This structure has an additional advantage in that the distance between the outer collector and the source may be varied independently of the distance between the inner collector and the source. The arrangement may be thought of as two gages in parallel. If the distance between collector and source is made large to satisfy the low pressure linearity of the gage, higher pressure linearity is sacrificed since the distance will exceed the maximum range of the primary particles. If the inner collector distance is kept smaller than the outer collector distance (both distances referred to the source) the primary ionizing particle range may be kept partially within the desired limits. An object of the invention, therefore, is to provide an appropriate compromise between the two dimensions so that the source of alpha particles is a greater distance from one of the collectors than the other of the collectors and thereby effect a larger linear range of operation than may otherwise be possible.

Another object of the invention is to further correct for the effects of the factor (3) by providing on one of the collectors a secondary source of emissions of alpha particles tending to counteract the radioactive disintegration current of the main source of emission of alpha particles.

Another object of the invention is to provide at the air inlet to an ionization pressure gage a novel de-ionizing screen maintained at a potential sufficiently more positive than the outer collector as to minimize the effects of externally produced ions in the atmospheric air entering the sensor and having particular utility in high velocity applications.

Another object of the invention is to provide an improved ion air density sensor device in which the aforenoted means have been provided so as to effect a sensor or gage which is highly reproducible in measurement and having a lower value of dark current than is otherwise the case so as to be capable of effecting lower pressure determinations than has been heretofore accomplished and a static characteristic which approximates the line B—B of the graph of FIGURE 5.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose. In the drawings:

FIGURE 3 is an end view of the sensor.

FIGURE 4 is a sectional view of the sensor taken along the lines 4—4 of FIGURE 3 and looking in the direction of the arrows.

Figure 5:
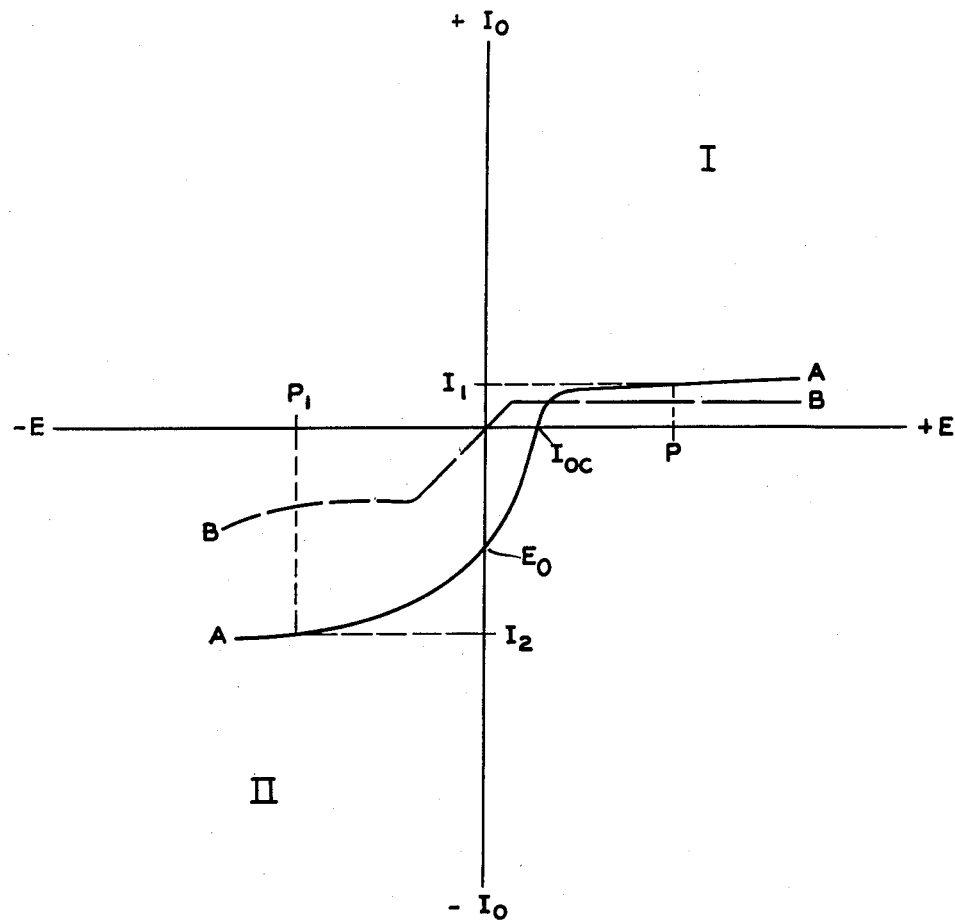

FIGURE 5 is a graph showing by a line A—A the static characteristic of the gage, without the improvements herein described, and taken at the minimum pressure obtainable with high-vacuum techniques; in which the voltage applied to the electrodes is varied from a positive value applied to the source electrode to a negative value and indicated on the graph along the line E+ to E— and in which the output current $I_o$ of the gage is measured and indicated along the line $+I_o$ to $-I_o$. There is further shown by a line B—B the static characteristic of the gage with the improvements herein provided.

Figure 1:
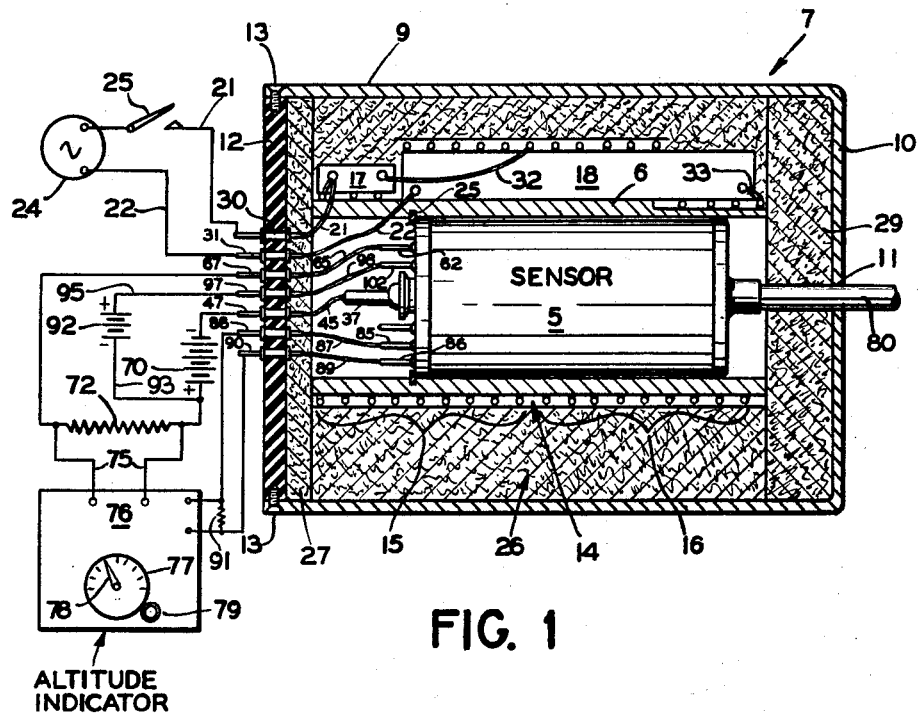
FIGURE 1 is a schematic showing of the sensor and oven in assembled relation.

Referring to the drawing of FIGURE 1, there is indicated generally by the numeral 5 an air density sensor device positioned within a tubular member 6 of copper or other good heat conducting material. The member 6 is in turn positioned within an oven 7 including a casing 9 having at one end a plate 10 with an aperture 11 therein and at the opposite end a panel of a suitable electrical insulation material removably fastened therein by bolts 13. There is further provided a heater assembly including heater coils 15 and 16 wound on the tubular member 6 and surrounding the sensor device 5.

The heater coils 15 and 16 are controlled by a coarse thermostatic switch 17 and a highly sensitive thermostatic switch 18 mounted on the tubular member 6, as shown in FIGURE 1. The thermostatic switches 17 and 18 may be of a conventional bimetal type each carried within a suitable casing and arranged to control the energizing circuit for the heater coils 15 and 16, as shown diagrammatically by FIGURE 2, so as to maintain the temperature within the oven 7 at a substantially constant predetermined value of for example 100° C. within ±.1° C. so that the temperature of the sampled air within the sensor 5 may be maintained at the predetermined constant value so as to provide, as hereinafter explained, a sensor output current directly proportional to the atmospheric pressure at the prevailing altitude level.

Figure 2:
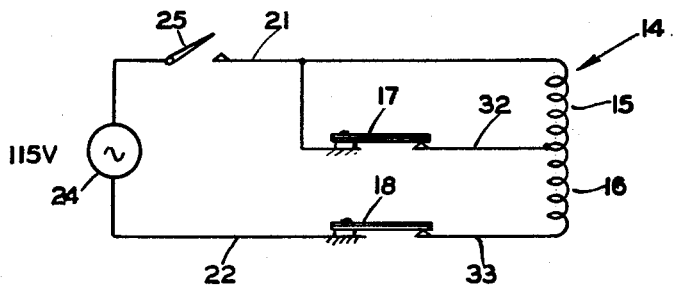
FIGURE 2 is a schematic wiring diagram of the heater coils and thermostatic controls for the oven.

In the arrangement, as shown in FIGURE 2, both the bimetallic thermostatic switch 17 and the bimetallic thermostatic switch 18 are initially closed so that upon the operator connecting conductors 21 and 22 across a suitable source of electrical energy 24 by closing a main control switch 25 the thermostatic switch 17 initially shunts the heater coil 15 so that the full energizing current is applied through the switch 17 and switch 18 to the coil 16. The energized heater coil 16 then rapidly increases the temperature within the oven 7 until the temperature approaches within a predetermined range of the desired temperature whereupon the switch 17 opens resulting in energization of both the heater coil 15 together with heater coil 16 until as the desired temperature is reached the highly sensitive thermostatic switch 18 opens and thereafter regulates the temperature within the oven 7 to the desired value by closing and opening the energizing circuit to the heater coils 15 and 16 as the regulated temperature value drops below and increases to the desired value.

As shown in FIGURE 1, the sensor device 5 is slidably mounted within the tubular member 6 so as to fit against a retaining ring 25 carried within the tubular member 6. Surrounding the sensor device 5 and tubular member 6 is the heater assembly 14 which in turn has wrapped around the assembly a blanket 26 of a suitable heat insulation fiberglass material which is packed into the space between the inner surface of the casing 9 and the tubular member 6. Further packed between the inner surface of the panel 12 and an end of the tubular member 6 is a pad 27 of such heat insulation fiberglass material while packed between the opposite end of the tubular member 6 and the inner surface of the end plate 10 is another pad 29 of the fiberglass material so that the heater assembly 14, tubular member 6 and sensor device 5 are supported by the fiberglass heat insulation wrapping 26 and pads 27 and 29 within the oven 7 and maintained therein under the predetermined regulated temperature of for example 100° C. within ±.1° C.

As shown in FIGURE 1, the electrical conductor 21 leads from the heater coil 15 and coarse thermostatic switch 17 through the fiberglass pad 27 to a terminal 30 mounted in the insulation panel 12 while the electrical conductor 22 leads from the highly sensitive thermostatic switch 18 controlling the heater coil 16 through the fiberglass pad 27 to a terminal 31 mounted in the panel 12. A conductor 32 leads from a center tap between heater coils 15 and 16 while a conductor 33 leads from an end of heater coil 16 to the switch 18. The conductor 32 leads from the center tap to switch 17.

The ion air density sensor 5, as shown in detail in FIGURE 3, includes a cylindrical casing 34 of a suitable heat conducting material such as copper having soldered thereto copper end plates 35 and 36.

A steel or Kovar rod 37 is concentrically mounted in the end plate 35 by a glass or porcelain electrical insulator member 39 sealed hermetically to member 41 which is engaged at 42 in a portion 43 of the end plate 35. The rod 37 is connected at one end to an electrical conductor 45 extending through the fiberglass pad 27 to an electrical terminal 47 mounted in the panel 12 of the oven 7. The opposite end of the bar 37 extends into the cylindrical casing 32 and has secured thereto a hollow tubular member 50 having a low thermal mass. The bar 37 has affixed thereto a portion 51 which provides an end support for the tubular member 50 to which the member 50 is fastened at 52. In the opposite end of the member 50 there is provided a second end portion 53 which may be soldered therein at 54.

There is further provided a cup-shaped cylindrical member 56 having a closed end portion 57 secured concentrically to the end portion 53 by a bolt 58 soldered to portion 57, and positioned within the cylindrical casing 34 in spaced relation to the casing 34 and the tubular member 50 so as to provide a space or air passageway 59 between the member 56 and the end plate 36 and casing 34.

Furthermore the outer surface of the member 50 and an inner surface of the member 56 may be nickel polished and rhodium plated so as to provide an electrode element comprising the two concentric cylinders 50 and 56 which completely enshrouds a radioactive cylindrical member 60 which serves as a second electrode element for the sensor 5.

The member 60 is positioned in spaced relation intermediate the concentric cylinders 50 and 56 and is affixed at one end to three steel or Kovar supporting pins 62 mounted in the end plate 35 by glass or porcelain insulation members 66 through which the supporting pins 62 extend to the exterior of the sensor 5. An electrical conductor 65 leads from an outer end of one of the supporting pins 62 and passes through the fiberglass pad 27 to an electrical terminal 67 mounted in the panel 12 of the oven 7.

The cylindrical cathode member 60 may be formed of silver impregnated at the inner and outer surfaces of the member 60 with radium chloride and then rhodium plated to trap the radon produced as a consequence of radioactive decay and so as to provide an ionizing source so arranged that alpha particles emitted by the radioactive material bombard the air molecules of the sampled air within the space between the cathode member 60 and the inner surface of the cylindrical member 56 and the outer surface of the tubular member 50 to produce positive and negative ions.

As shown in FIGURE 1, the members 50 and 56 are connected through terminal 47 to a negative terminal of a source of electrical energy or biasing voltage such as a battery 70 so as to form a cathode element of the sensor 5, while the positive terminal of the battery 70 may be connected through a resistor 72 to the terminal 67 leading to the member 60 so that the member 60 forms an anode element of the sensor 5. Output lines 75 lead from across the resistor 72 to provide an output signal voltage directly proportional to the density, or with temperature stabilization to the pressure of the sampled atmospheric air so as to control an altitude indicator electrical control mechanism 76 which may be of a type such as explained in the aforenoted U.S. application Serial No. 693,323 or of a type such as described and claimed in the aforenoted U.S. Patent No. 3,044,012, granted July 10, 1962, to George V. Zito and Edward A. Chilton.

The mechanism 76 may include a dial 77 having indicia thereon cooperating with an indicator pointer 78 adjustably positioned by a servomotor in the mechanism 76 to indicate the prevailing altitude. The dial 77 may be initially adjusted relative to the indicator pointer 78 by suitable means such as a manually operable knob 79 drivingly connected to the dial 77 in a manner well known in the altimeter art. Thus the indicia on the dial 77 may be initially set so as to correct for variations in the barometric pressure or air density from the standard condition at a given altitude level of for example sea level and after which correction the pointer 78 may coincide with the correct indicia at the given altitude level, while at other altitude levels the indicator pointer 78 will be adjusted through the mechanism 76 so as to coincide with such initially adjusted indicia to indicate the altitude level under the then prevailing barometric pressure and air density condition.

In the sensor 5, the positive ions produced upon ionization of the sampled air are attracted to the negative electrode or cathode members 50 and 56 owing to the electrostatic field within the chamber of the sensor 5 produced by the battery 70 while the negative ions or electrons migrate toward the positive electrode or anode member 60 and through the resistor 72 to the positive terminal of the battery 70. There is thus an electron flow from the negative terminal of the battery 70 through the sensor 5 and resistor 72 (proportional to the density or pressure of the air sampled at the sensor 5) and to the positive terminal of the battery 70 to complete the electrical circuit. The alpha particles provide a very constant source of ionization potential, and thus the control current flow obtained is a function of the molecular density of the gas filling the space between the cathode members 50 and 56 and the anode member 60.

Thus, as the density of the sampled air increases the output control current across the resistance 72 increases while as the density of the sampled air decreases the output control current across the resistance 72 decreases because of the variation in the total number of gas molecules ionized in the sampled air.

Opening into the casing 34 at a point concentric with the end portion 57 of the cylindrical cup-shaped member 56 is an air inlet conduit or tube 80 extending through the aperture 11 and leading from a static pressure probe, such as a Pitot static probe of conventional type mounted on an aircraft. The tubing 80 has a minimum length and a diameter sufficiently large so as to minimize pneumatic time lags due to air flow where pressure is changing rapidly.

The arrangement is such that air under the prevailing atmospheric pressure at the level of flight of the aircraft on entering at the adit or air inlet tube 80 is baffled by the end portion 57 of the cup-shaped anode member 56 so that it must pass through the passageway 59 formed between the casing 34 and the member 56 so as to be brought into a close thermal equilibrium with the casing 34, before entering the system of concentric cylinders and passing in turn between the anode member 60 and cathode member 56 and the anode member 60 and the cathode member 50 where the sampled air is subjected to ionizing radiation. The sensor 5 is thus "dead-ended" so as to in effect breathe the atmosphere to be measured upon changes in the effective pressure thereof rather than being subjected to appreciable air flow.

Thus, upon an increase in the prevailing atmospheric pressure as upon a decrease in the altitude of the aircraft the sampled air under such increase in pressure tends to move under compression within passageway 59 along the inner surface of the casing 34 before being subject to ionization while upon a decrease in the prevailing atmospheric pressure as upon an increase in the altitude of the aircraft, the sampled air within the sensor 5 upon such decrease in the atmospheric pressure applied thereto tends to move within the passageway 59 upon decompression and out the conduit 80 so as to equalize the pressure of the sampled air within the sensor device 5 with that of the atmospheric pressure prevailing at the level of flight of the aircraft.

The foregoing structure is described and claimed in the copending U.S. application Serial No. 15,449 filed March 16, 1960 by Joseph Steenfeld and George V. Zito. As shown in FIGURES 3 and 4, there is further provided in the ion air density sensor 5 a temperature responsive means for sensing the temperature of the sampled atmospheric air within the sensor 5, including a thermistor bead 82 supported by electrical conductors 83 and 84 soldered to the inner ends of two steel or Kovar supporting pins 85 and 86 mounted in the end plate 35 by glass or porcelain insulation members through which the supporting pins 85 and 86 extend from the interior to the exterior of the sensor 5. As shown in FIGURE 1, an electrical conductor 87 leads from an outer end of the supporting pin 85 and passes through the fiberglass pad 27 to an electrical terminal 88 mounted in the panel 12 of the oven 7 while a second electrical conductor 89 leads from an outer end of the other supporting pin 86 and through the fiberglass pad 27 to an electrical terminal 90 mounted in the panel 12.

Connected across the terminals 88 and 90 of the thermistor bead 82 is a resistor element 91. The thermistor bead 82 may be an element formed of a suitable carbon alloy and having a negative temperature coefficient of resistance while resistor element 91 has a low temperature coefficient of resistance and serves to calibrate the thermistor bead 82 connected in the temperature compensating circuit of a control system such as described and claimed in the aforenoted U.S. Patent No. 3,044,012 granted July 10, 1962 to George V. Zito and Edward A. Chilton.

Dark Current Correction Means

In the control system, as shown in FIGURES 1 and 4, there is provided a source of electrical energy or biasing battery 92 having a negative terminal connected through a conductor 93 to the positive terminal of the battery 70 while the positive terminal of the battery 92 is connected by a conductor 95 to a terminal 97 mounted in the panel 12 of the oven 7 and connected through an electrical conductor 98 to a steel or Kovar supporting pin 102 mounted in the end plate 35 by a glass or porcelain insulation member 103 through which the supporting pin 102 extends into the interior of the sensor 5.

At the interior of the sensor 5, the supporting pin 102 has a pair of arms 105 and 106. The arm 105 is arranged to support at the free end thereof a helical coil 108 of a suitable electrical conductive material wound about the radioactive cylindrical member 60 in close spaced proximity thereto and between the alpha particle emitter member 60 and the outer collector member 56. Similarly the arm 106 is arranged to support at the free end thereof a second helical coil 110 of a suitable electrical conductive material wound within the radioactive cylindrical member 60 in close spaced proximity thereto and between the alpha particle emitter member 60 and the inner collector member 50.

The helical coils 108 and 110 provide a pair of shield grids maintained at a potential sufficiently more positive (viz. +34 volts) than the source electrode 60 that the "delta electrons" or slow electron emissions from the source 60 will be collected by the shield grids 108 and 110 and prevented from traversing the sensitive volume.

In reference to the graph of FIGURE 5 and particularly the line B—B, it will be noticed that in the Region I, the region in which the gage is usually operated, that the value of the output current is decreased by the use of the screen or shield grids 108 and 110, and that its resistance slope approaches an infinite value, making the current independent of the applied voltage at the point P of usual operation and that the line B—B indicative of the characteristic operation thereof crosses the zero current point at the zero voltage point.

Furthermore, in order to correct for the consequences of secondary electron emissions from the collector members 50 and 56, the surfaces of the collector members 50 and 56 are, as heretofore explained, nickel polished and rhodium plated.

In this connection, referring to the graph of FIGURE 5, it has been found that the point $I_{oc}$ is a function of the collector material and of the condition of the collector surfaces. Experimental evidence secured for a variety of collector materials discloses that if $E_o$ is plotted as a function of collector material, the cross-over point at $I_{oc}$ will be inversely proportional to the secondary electron emission yield of the collector: the greater the secondary electron emission yield, the closer to zero will point $E_o$ fall. It is believed that this is due to the emission of secondary electrons at the collector as a result of the impingement of primary particles of high energy from the source. Secondary electrons leaving the collector will tend to make the collector more positive in potential, and this subtracts from the negative going current originated by the source. Although platinum yields a somewhat lower $E_o$ value than rhodium, rhodium has been decided upon for several contingent reasons. Rhodium is the least affected by atmospheric chemicals, and hence it is possible to maintain a cleaner surface for a longer period of time than is the case with platinum. A clean surface is important for a low, reproducible value of I, and rhodium yields the lowest value here of all metals tested, and is second only to platinum in $E_o$ value. Rhodium also is the least affected of all known metals with respect to induced radioactivity. In addition, in the device hereinafter described, since a rhodium flash covers the source material, those consequences due to dissimilar metals, which seem to play some role in the value of point $I_{oc}$, are excluded. If the collector surfaces are first polished and then rhodium plated, the smooth hard surface of the rhodium greatly decreases gas sorption to help minimize out-gassing time at very low pressures.

Furthermore, the structural arrangement of the sensor or gage device 5 as shown in FIGURE 4, is such that the distance between the outer collector member 56 and the source or alpha particle emitter 60 is greater than the distance between the inner collector member 50 and the source or alpha particle emitter 60 so as to provide in effect two gages connected in parallel.

In this connection, if the distance between the collector members and source be made large to satisfy a low pressure linearity of the gage, higher pressure linearity is sacrificed since the distance will exceed the maximum range of the primary particles. However, if the distance of the inner collector member 50 is kept smaller than the distance of the outer collector member 56 (both distances being referred to the source 60) the primary ionizing particle range may be kept partially within the desired limits. Thus an appropriate compromise between the two dimensions such that the source 60 of alpha particles is a greater distance from one of the collector members than the other may effect a desirable greater linear range of operation than might otherwise be possible.

In order to further correct for dark current resulting from a radioactive disintegration effect of alpha particles supplied by the main source of emission 60 there is provided on one of the collector members a secondary source of emissions of alpha particles, shown in FIGURE 4, as a suitable silver foil 115 impregnated with radium and affixed to the inner surface of the outer collector member 56 and arranged to provide a secondary emission of alpha particles tending to counteract the radioactive disintegration effect of the main source of emission of alpha particles from the member 60.

There are further affixed to the free end of the radioactive cylindrical member 60, steel or Kovar pins 117 which extend through suitable openings 119 in the end portion 57 of the cylindrical cup-shaped member 56 and support at the outer ends thereof and in the end passage 59 a de-ionizing screen 121 of a suitable electrical conductive material having applied thereto a potential sufficiently more positive than the negative charge applied to the collector member 56 as to tend to minimize the consequences of externally produced ions in the atmospheric air entering the sensor or gage 5.

Through the foregoing novel structure and arrangement, there is provided an ion air density sensor or gage which is highly reproducible in measurement with a lower value of dark current, as indicated graphically in FIGURE 5 by the line B—B, so as to be capable of reading lower pressures.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In an air density sensor device of a type including spaced anode and cathode elements for providing a sampling zone therebetween, means for supplying air under prevailing atmospheric pressure to said sampling zone, radioactive material carried by the anode element to provide a source of alpha particles emitted therefrom to ionize the air in the sampling zone, and means operatively connected between said anode and cathode elements to provide an output signal proportional to the density of the air in the sampling zone; the improvement comprising a shielding member positioned in spaced proximity to the radioactive material, and a source of electrical energy to maintain the shielding member at a potential sufficiently more positive than the anode element so that delta electrons emitted from the radioactive material may be collected by the shielding member and prevented from traversing the sampling zone between the anode and cathode elements.

2. In an air density sensor device of a type including spaced anode and cathode elements for providing a sampling zone therebetween, means for supplying air under prevailing atmospheric pressure to said sampling zone, radioactive material carried by the anode element to provide a source of alpha particles emitted therefrom to ionize the air in the sampling zone, and means operatively connected between said anode and cathode elements to provide an output signal proportional to the density of the air in the sampling zone; the improvement comprising a helical coil of an electrical conductive material positioned in spaced proximity to the radioactive material, and a source of electrical energy to maintain the coil at a potential sufficiently more positive than the anode member so that slow electrons emitted from the radioactive material may be attracted to the helical coil and thereby prevented from traversing the sampling zone from the anode element to the cathode element and causing an erroneous output signal from the means operatively connected between the anode and cathode elements.

3. In an air density sensor device of a type including spaced anode and cathode elements for providing a sampling zone therebetween, means for supplying air under prevailing atmospheric pressure to said sampling zone, radioactive material carried by the anode element to provide a source of alpha particles emitted therefrom to ionize the air in the sampling zone, and means operatively connected between said anode and cathode elements to provide an output signal proportional to the density of the air in the sampling zone; the improvement comprising a shielding member positioned in spaced proximity to the radioactive material, and a source of electrical energy to maintain the shielding member at a potential sufficiently more positive than the anode element so that delta electrons emitted from the radioactive material may be collected by the shielding member and prevented from traversing the sampling zone between the anode and cathode elements, and other radioactive material carried by the cathode element to provide a secondary emission of alpha particles to counteract effects of radioactive disintegration of the first mentioned radioactive material carried by the anode element, the delta electron collecting effect of the shielding member and the counteracting effect of the other radioactive material tending to decrease dark current values so as to increase low density output signal effects of the means operatively connected between the anode and cathode elements.

4. In an air density sensor device of a type including spaced anode and cathode elements for providing a sampling zone therebetween, means for supplying air under prevailing atmospheric pressure to said sampling zone, radioactive material carried by the anode element to provide a source of alpha particles emitted therefrom to ionize the air in the sampling zone, and means operatively connected between said anode and cathode elements to provide an output signal proportional to the density of the air in the sampling zone; the improvement comprising a helical coil of an electrical conductive material positioned in spaced proximity to the radioactive material, and a source of electrical energy to maintain the coil at a potential sufficiently more positive than the anode member so that slow electrons emitted from the radioactive material may be attracted to the helical coil and thereby prevented from traversing the sampling zone from the anode element to the cathode element, and other alpha particle emitting means carried by said cathode element for providing a secondary emission of alpha particles to counteract effects of radioactive disintegration of the first mentioned radioactive material carried by the anode element, the slow electron collecting effect of the helical coil and the counteracting effect of the other alpha particle emitting means tending to decrease dark current values so as to increase minimal low density output signal effects of the means operatively connected between the anode and cathode elements.

5. In a density sensor device of a type including a casing, a pair of coaxial cylindrical members positioned within said casing in spaced relation to provide a first electrode, another cylindrical member extending between said pair of coaxial members in spaced relation thereto to provide a second electrode, said other cylindrical member cooperating with said pair of cylindrical members to provide sampling zones therebetween, said other cylindrical member having inner and outer surfaces impregnated with radioactive material to effectively ionize the sampling zones, conduit means opening into said casing for applying a gaseous medium under a variable pressure within said casing and into said sampling zones, and electrical means for maintaining the first electrode at a lower potential than the second electrode and operatively connected between said electrodes for effecting an output signal directly proportional to the density of the air within said sampling zones; the improvement comprising a pin projecting into the casing and having a pair of arms positioned within the casing and in spaced proximity to the inner and outer surfaces respectively of said other cylindrical member, a first helical coil member of an electrical conductive material affixed to one of said arms and positioned in spaced proximity to the inner surface of said other cylindrical member, a second helical coil member of an electrical conductive material affixed to the other of said arms and positioned in spaced proximity to the outer surface of said other cylindrical member, and a source of electrical energy to maintain the helical coils at a potential sufficiently greater than said second electrode that delta electrons emitted from the inner and outer surfaces of said other cylindrical member may be collected by the first and second coil members and prevented from traversing the sampling zones so as to minimize prevailing dark current values.

6. In a density sensor device of a type including a casing, a first cylindrical member positioned within said casing to provide a first electrode, a second cylindrical member positioned within said first cylindrical member in spaced relation thereto so as to provide a second electrode, said second cylindrical member cooperating with said first cylindrical member to provide a sampling zone therebetween, one of said electrodes having a surface bearing a radioactive material to effectively ionize the sampling zone, conduit means opening into said casing for applying a gaseous medium under a variable pressure within said casing, said casing having an inner surface spaced from said first cylindrical member so as to provide a passageway permitting movement of the gaseous medium into the sampling zone between said first and second cylindrical members upon compression of the gaseous medium and said passageway permitting movement of the gaseous medium out of the sampling zone upon decompression of the gaseous medium during variations in the pressure of the gaseous medium applied within said casing, and electrical means for maintaining one of the electrodes at a lower potential than the other of the electrodes and operatively connected between said electrodes for effecting an output signal directly proportional to the density of the gaseous medium within said sampling zone; the improvement comprising a de-ionizing screen of an electrical conductive material positioned at the opening of said conduit means into said casing and within the space between the inner surface of said casing and the first cylindrical member, and means electrically connecting said screen to said second cylindrical member so as to apply an electrical bias to said screen tending to minimize the effect of externally produced ions in the gaseous medium entering said casing through said conduit means.

7. A density sensor device comprising a casing, a pair of coaxial cylindrical members including an outer cylindrical member and an inner cylindrical member, said pair of cylindrical members being positioned within said casing in spaced relation to provide a first electrode, another cylindrical member extending between said pair of coaxial cylindrical members in spaced relation thereto to provide a second electrode, said other cylindrical member being spaced a greater distance from one of said pair of coaxial cylindrical members than from the other of said pair of coaxial cylindrical members and cooperating with said pair of coaxial cylindrical members to provide different effective sampling zones therebetween to increase the effective density sensing range, said cylindrical members including surfaces bearing a radioactive material to effectively ionize the sampling zones and opposite collector surfaces, conduit means opening into said casing for applying a gaseous medium under a variable pressure within said casing, said casing having an inner surface spaced from the outer cylindrical member of said pair of coaxial cylindrical members so as to provide a passageway permitting movement of the gaseous medium into the sampling zones between said pair of coaxial cylindrical members and said other cylindrical member upon compression of the gaseous medium and said passageway permitting movement of the gaseous medium out of the sampling zones upon decompression of the gaseous medium during variations in the pressure of the gaseous medium applied within said casing.

8. A density sensor device comprising a casing, a pair of coaxial cylindrical members including an outer cylindrical member and an inner cylindrical member, said pair of cylindrical members being positioned within said casing in spaced relation to provide a first electrode, another cylindrical member extending between said pair of coaxial cylindrical members in spaced relation thereto to provide a second electrode, said other cylindrical member being spaced a greater distance from one of said pair of coaxial cylindrical members than from the other of said pair of coaxial cylindrical members and cooperating with said pair of coaxial cylindrical members to provide different effective sampling zones therebetween to increase the effective density sensing range, said cylindrical members including surfaces bearing a rhodium plated radioactive material to effectively ionize the sampling zones and opposite collector surfaces of rhodium to avoid adverse effects of secondary electron emissions therefrom, conduit means opening into said casing for applying a gaseous medium under a variable pressure within said casing, said casing having an inner surface spaced from the outer cylindrical member of said pair of coaxial cylindrical members so as to provide a passageway permitting movement of the gaseous medium into the sampling zones between said pair of coaxial cylindrical members and said other cylindrical member upon compression of the gaseous medium and said passageway permitting movement of the gaseous medium out of the sampling zones upon decompression of the gaseous medium during variations in the pressure of the gaseous medium applied within said casing.

9. In a density sensor device of a type including a casing, a pair of coaxial cylindrical members including an outer cylindrical member and an inner cylindrical member, said pair of cylindrical members being positioned within said casing in spaced relation to provide a first electrode, another cylindrical member extending between said pair of coaxial members in spaced relation thereto to provide a second electrode, said other cylindrical member cooperating with said pair of cylindrical members to provide sampling zones therebetween, said other cylindrical members having inner and outer surfaces impregnated with radioactive material to effectively ionize the sampling zones, conduit means opening into said casing for applying atmospheric air under a variable pressure within said casing, said casing having an inner surface spaced from the outer cylindrical member of said pair of cylindrical members so as to provide a passageway permitting movement of the air into the sampling zones between said pair of coaxial members and said other cylindrical member upon an increase in the pressure of the atmospheric air and said passageway permitting movement of air out of the sampling zones upon a decrease in the pressure of the atmospheric air, and electrical means for maintaining the first electrode at a lower potential than the second electrode and operatively connected between said electrodes for effecting an output signal directly proportional to the density of the air within said sampling zones; the improvement comprising another member impregnated with a radioactive material and carried by one of said pair of cylindrical members of said first electrode for providing a secondary emission of alpha particles to counteract effects of radioactive disintegration of the radioactive material carried by the second electrode, a pin projecting into the casing and having a pair of arms positioned within the casing and in spaced proximity to the inner and outer surfaces respectively of said other cylindrical member, a first helical coil member of an electrical conductive material affixed to one of said arms and positioned in spaced proximity to the inner surface of said other cylindrical member, a second helical coil member of an electrical conductive material affixed to the other of said arms and positioned in spaced proximity to the outer surface of said other cylindrical member, and a source of electrical energy connected between said other cylindrical member and said helical coil members to maintain the helical coil members at a potential sufficiently greater than said other cylindrical member that delta electrons emitted from the inner and outer surfaces of said other cylindrical member may be collected by the first and second coil members and prevented from traversing the air in the sampling zones so as to minimize prevailing dark current values, a de-ionizing screen of an electrical conductive material positioned at the opening of said conduit means into said casing and within the passageway provided by the space between the inner surface of the casing and the outer cylindrical member of said pair of cylindrical members, means electrically connecting said screen to said other cylindrical member of the second electrode so that there is applied through said other cylindrical member to said screen a potential sufficiently greater than the potential applied to the outer cylindrical member of said first electrode as to tend to minimize the effect of externally produced ions in the air under prevailing atmospheric pressure entering said casing through said conduit means, said other cylindrical member being spaced a greater distance from one of said pair of coaxial cylindrical members than from the other of said pair of coaxial cylindrical members and cooperating with said pair of coaxial cylindrical members to provide different effective sampling zones therebetween to increase the effective density sensing range, the inner and outer surfaces of said other cylindrical member impregnated with radioactive material being plated with rhodium, and the inner and outer members having opposite collector surfaces of rhodium to avoid adverse effects of secondary electron emissions therefrom.

References Cited in the file of this patent

UNITED STATES PATENTS

| | | |
|---|---|---|
| 1,650,921 | Winkelmann | Nov. 29, 1927 |
| 2,032,545 | McElrath | Mar. 3, 1936 |
| 2,497,213 | Downing | Feb. 14, 1950 |
| 2,968,730 | Morris et al. | Jan. 17, 1961 |
| 2,976.442 | Ridenour | Mar. 21, 1961 |